(12) United States Patent
Thompson et al.

(10) Patent No.: US 10,626,618 B2
(45) Date of Patent: Apr. 21, 2020

(54) AWNING CANOPY COVER AND CONNECTION SYSTEM

(71) Applicant: Carefree/Scott Fetzer Company, Westlake, OH (US)

(72) Inventors: Scott Patrick Thompson, Aspen, CO (US); Eugene Pennington Smith, Westminster, CO (US)

(73) Assignee: Carefree/Scott Fetzer Company, Broomfield, CO (US)

( * ) Notice: Subject to any disclaimer, the term of this patent is extended or adjusted under 35 U.S.C. 154(b) by 176 days.

(21) Appl. No.: 15/840,485

(22) Filed: Dec. 13, 2017

(65) Prior Publication Data

US 2018/0100309 A1 Apr. 12, 2018

Related U.S. Application Data

(62) Division of application No. 14/704,487, filed on May 5, 2015, now Pat. No. 9,850,663.

(60) Provisional application No. 61/988,461, filed on May 5, 2014.

(51) Int. Cl.
*E04F 10/02* (2006.01)
*E04F 10/06* (2006.01)

(52) U.S. Cl.
CPC ...... *E04F 10/0625* (2013.01); *E04F 10/0662* (2013.01); *E04F 10/0666* (2013.01); *E04F 10/0685* (2013.01); *B32B 2367/00* (2013.01); *E04F 10/0629* (2013.01); *E04F 10/0648* (2013.01); *E04F 10/0651* (2013.01)

(58) Field of Classification Search
CPC ....... E04F 10/02; E04F 10/06; E04F 10/0611; E04F 10/0625; E04F 10/0633; E04F 10/0662; E04F 10/0666; E04F 10/0685; E04F 10/0648; E04F 10/0651; E04F 10/0629
See application file for complete search history.

(56) References Cited

U.S. PATENT DOCUMENTS

| | | | | |
|---|---|---|---|---|
| 3,324,869 | A | * | 6/1967 | Duda ............. B60P 3/343 135/88.12 |
| 3,826,271 | A | | 7/1974 | Sattler |
| 3,911,190 | A | * | 10/1975 | Myers ............. B32B 27/00 428/305.5 |
| 4,180,117 | A | | 12/1979 | Greer |
| 4,331,169 | A | | 5/1982 | Bonser |
| 4,476,173 | A | | 10/1984 | Bachmann |
| 4,576,192 | A | | 3/1986 | Duda |
| 4,794,971 | A | | 1/1989 | Lohausen |

(Continued)

FOREIGN PATENT DOCUMENTS

EP 1083270 A2 * 3/2001 ......... B29C 65/5057

*Primary Examiner* — Johnnie A. Shablack
(74) *Attorney, Agent, or Firm* — Tarolli, Sundheim, Covell & Tummino LLP; John A. Yirga, Esq.

(57) ABSTRACT

An awning assembly having an awning connection system for coupling an awning canopy to a support structure and providing a cover to the awning canopy when the awning assembly is in a closed position. The awning connection system comprises a unitary film segment having a distal end connected to the awning canopy and a proximal end for securing to the support structure. The unitary film segment further comprises an attached region for coupling the unitary film segment to the awning canopy.

20 Claims, 13 Drawing Sheets

(56) References Cited

U.S. PATENT DOCUMENTS

| | | | |
|---|---|---|---|
| 4,821,785 A | 4/1989 | Rolan | |
| 4,834,160 A | 5/1989 | Becker | |
| 4,909,296 A | 3/1990 | Sellke | |
| 4,924,895 A | 5/1990 | Bailie | |
| 5,409,772 A * | 4/1995 | Yabusa | B32B 27/06 |
| | | | 428/335 |
| 5,437,322 A | 8/1995 | Murray | |
| 5,486,391 A | 1/1996 | Tyner | |
| 5,496,630 A * | 3/1996 | Hawrylko | B32B 27/20 |
| | | | 428/328 |
| 5,575,324 A | 11/1996 | Hwang | |
| 5,680,893 A * | 10/1997 | Neer | A47H 21/00 |
| | | | 160/330 |
| 5,692,554 A | 12/1997 | Huang | |
| 5,756,171 A * | 5/1998 | Moteki | B32B 27/08 |
| | | | 428/36.6 |
| 5,820,201 A | 10/1998 | Jabalee | |
| 6,092,584 A | 7/2000 | Humphries | |
| 6,260,909 B1 | 7/2001 | Crean | |
| 6,279,641 B1 | 8/2001 | Malott | |
| 6,341,638 B1 | 1/2002 | Thompson | |
| 6,619,726 B2 | 9/2003 | Jones | |
| 6,855,652 B2 * | 2/2005 | Hable | B32B 5/02 |
| | | | 420/426 |
| 6,971,433 B2 | 12/2005 | Wagner et al. | |
| 7,188,889 B2 | 3/2007 | Wagner | |
| 7,604,036 B2 | 10/2009 | Thompson et al. | |
| 7,628,194 B2 | 12/2009 | Wagner | |
| 7,775,255 B2 | 8/2010 | Albert | |
| 9,850,663 B1 * | 12/2017 | Thompson | E04F 10/0662 |
| 2003/0094826 A1 * | 5/2003 | Thompson | B60P 3/36 |
| | | | 296/24.41 |
| 2003/0094833 A1 | 5/2003 | Thompson | |
| 2007/0044388 A1 | 3/2007 | Lajoic | |
| 2008/0163984 A1 | 7/2008 | Lambey | |
| 2010/0024991 A1 * | 2/2010 | Thompson | B60P 3/343 |
| | | | 160/67 |
| 2012/0238166 A1 * | 9/2012 | Nasarczyk | D06N 3/0038 |
| | | | 442/85 |
| 2014/0062126 A1 | 3/2014 | Weinberg | |
| 2014/0110065 A1 | 4/2014 | Beland | |
| 2015/0075733 A1 | 3/2015 | Piccin | |
| 2015/0274058 A1 | 10/2015 | Beland | |
| 2018/0100309 A1 * | 4/2018 | Thompson | E04F 10/0662 |

* cited by examiner

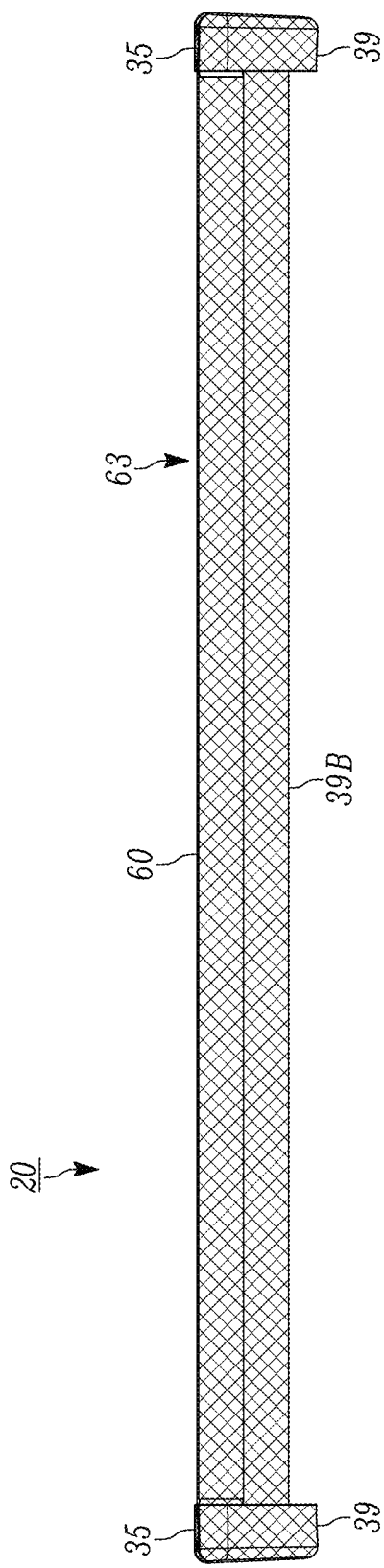
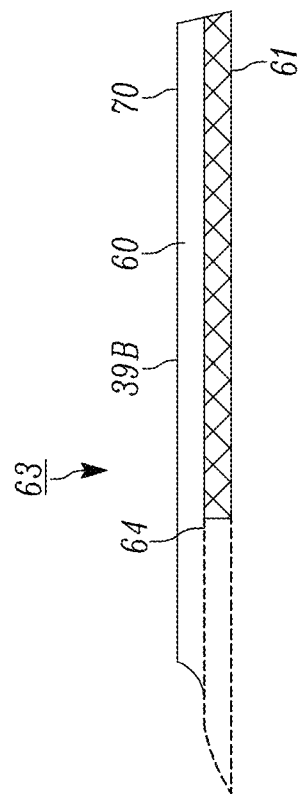
FIG. 11
FIG. 12

AWNING CANOPY COVER AND CONNECTION SYSTEM

CROSS-REFERENCE TO RELATED APPLICATIONS

The present application is a divisional application and claims priority under 35 U.S.C. § 121 to U.S. patent application Ser. No. 14/704,487 filed May 5, 2015 that will issue as U.S. Pat. No. 9,850,663 that will issue on Dec. 26, 2017, which claims priority under 35 U.S.C. § 119(e) to U.S. Provisional Patent Application Ser. No. 61/988,461 filed May 5, 2014. The above-identified applications are incorporated herein by reference in their entireties for all purposes.

FIELD OF THIS DISCLOSURE

The present disclosure relates to an awning canopy cover and connection system, and more particular, a system that protects and secures an awning to a structure as well provides protection and an overall visual appeal to the awning assembly.

BACKGROUND

An awning is a welcome addition to a house, recreational vehicle, or other dwelling. The awning typically provides increased enjoyment of an outdoor area surrounding the dwelling. The awning can cast a shaded area that creates an escape from direct sunlight, thereby providing a space in which an occupant of the dwelling may relax. The shaded area created by the awning contributes to the relaxation of the occupant in that there is a perceived decrease in temperature and, thus, generally becomes more comfortable. The awning as well advantageously protects occupants underneath from precipitation.

Known awning structures generally consist of a base that is permanently affixed to the dwelling, and a canopy that is removably attached to the base. The canopy is typically constructed of vinyl, cloth or a combination thereof. Such known awnings are expensive to fabricate in order to provide protection to the awning in the stored position as further discussed in U.S. Pat. No. 5,437,322 to Murray and U.S. Pat. No. 7,604,036 to Thompson et al. both assigned to Carefree/Scott Fetzer Company and U.S. Pat. No. 6,279,641 to Malott assigned to White Consolidated Industries, Inc. collective hereinafter "the Awning Patents". The above Awning Patents are incorporated herein by reference in their entireties for all purposes.

SUMMARY

One aspect of the present disclosure comprises an awning assembly having an awning connection system for coupling an awning canopy to a support structure and providing a cover to the awning canopy when the awning assembly is in a closed position. The awning connection system comprises a unitary flexible film segment having a distal end connected to the awning canopy and a proximal end for securing to the support structure. The unitary film segment further comprises an attached region for coupling the unitary film segment to the awning canopy.

Another aspect of the present disclosure comprises a method of constructing an awning assembly having an aesthetic awning cover that achieves a desired aesthetic appearance, the method comprises the steps of: providing a unitary film along a first portion of an awning screen, the unitary film being a set width substantially matching the width of the awning screen and a portion of the length of the awning screen. The unitary film is integrally formed from a first polishing material and a second strengthening material. The method further comprises securing the unitary film by a heating process along the set width to an awning canopy, the awning canopy having a substantially same width as the set width of the unitary film and the awning canopy has a length forming the remaining portion of the awning screen, the combination of the unitary film and the awning canopy forming the awning screen. The method also comprises securing the awning screen to a roll bar of an awning assembly such that when the awning assembly is in a closed position, the unitary film provides an awning cover to the awning assembly.

While another aspect of the present disclosure comprises an awning assembly having an aesthetic awning cover that achieves a desired aesthetic appearance. The awning assembly comprises an awning screen having a prescribed length and width to form a screened area and to provide shelter in an extended position, the awning screen is attached to a roll bar and support hardware allowing the awning screen to transition by coiling onto the roll bar as the awning screen moves from the extended position to a closed position. The awning screen is constructed of a first portion formed by a unitary film and a second portion formed by an awning canopy. The first portion is attached to the second portion and the first portion further includes an area less than the area forming the second portion. The unitary film comprises a first polished material that is bonded to a second strengthening material, the polished material comprises a gloss level ranging between 30 and 100%.

BRIEF DESCRIPTION OF THE SEVERAL VIEWS OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 11 is a perspective view of the awning assembly in FIGS. 7 and 9 in a retracted position;

FIG. 12 is a film segment formed with a reinforcement substrate in accordance with one example embodiment of the present disclosure;

Figure 2:
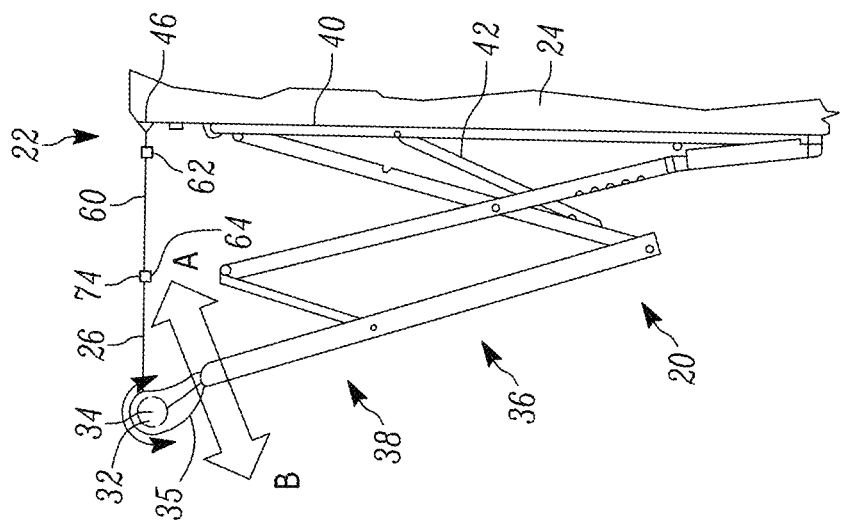
FIG. 2 is a side elevation view of an awning assembly in a partially expanded or retracted position in accordance with one example embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements having similar characteristics and operational properties throughout unless otherwise noted. The present disclosure relates to an awning canopy cover and connection system, and more particular, a system that protects and secures an awning to a structure as well provides protection and an overall visual appeal to the awning assembly.

Now referring to FIGS. 1-11, an awning assembly 20 is illustrated. The awning assembly 20 includes a connection system 22 that is mounted to a vertical support surface 24, which might be for example, the side wall of a recreational vehicle, mobile home, a recreational vehicle slide-out, or more permanent building structure. The awning assembly 20 includes a flexible awning canopy 26 having an inner or proximal edge 28 secured to the flexible connection system 22 in a manner to be described in more detail hereafter and an outer edge 30 secured to a roll bar 32, which can be motor, manually, or spring driven by one or more motors 34, gears, or springs that are operatively connected to and supported by a support system 36 in the form of a pair of scissors-type arms 38.

Figure 1:
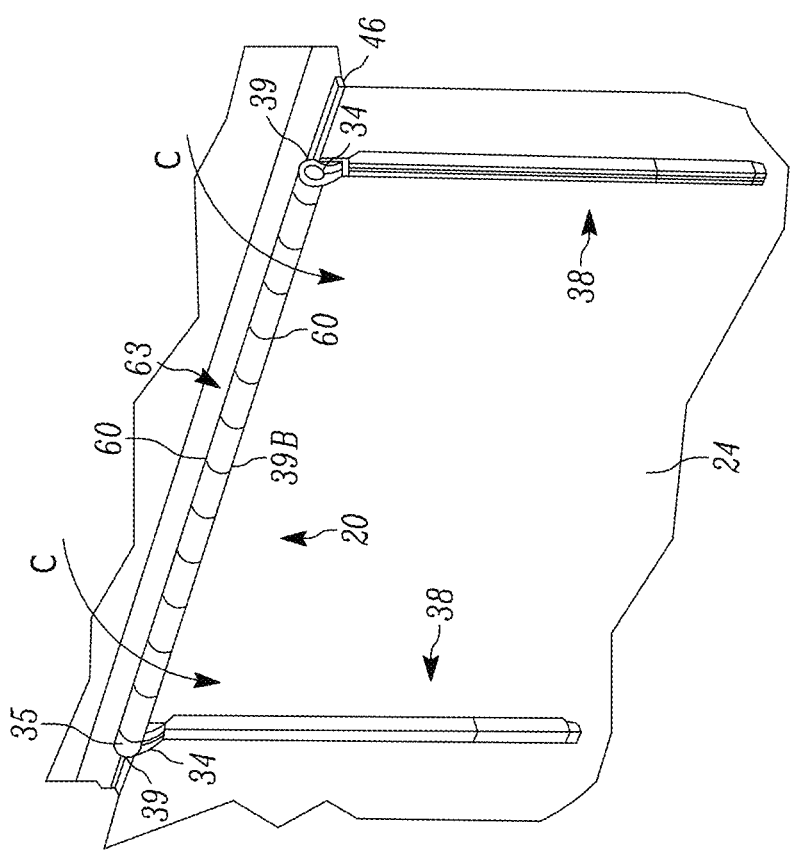
FIG. 1 is a perspective view of an awning assembly in a retracted or closed position in accordance with one example embodiment of the present disclosure.
Figure 3:
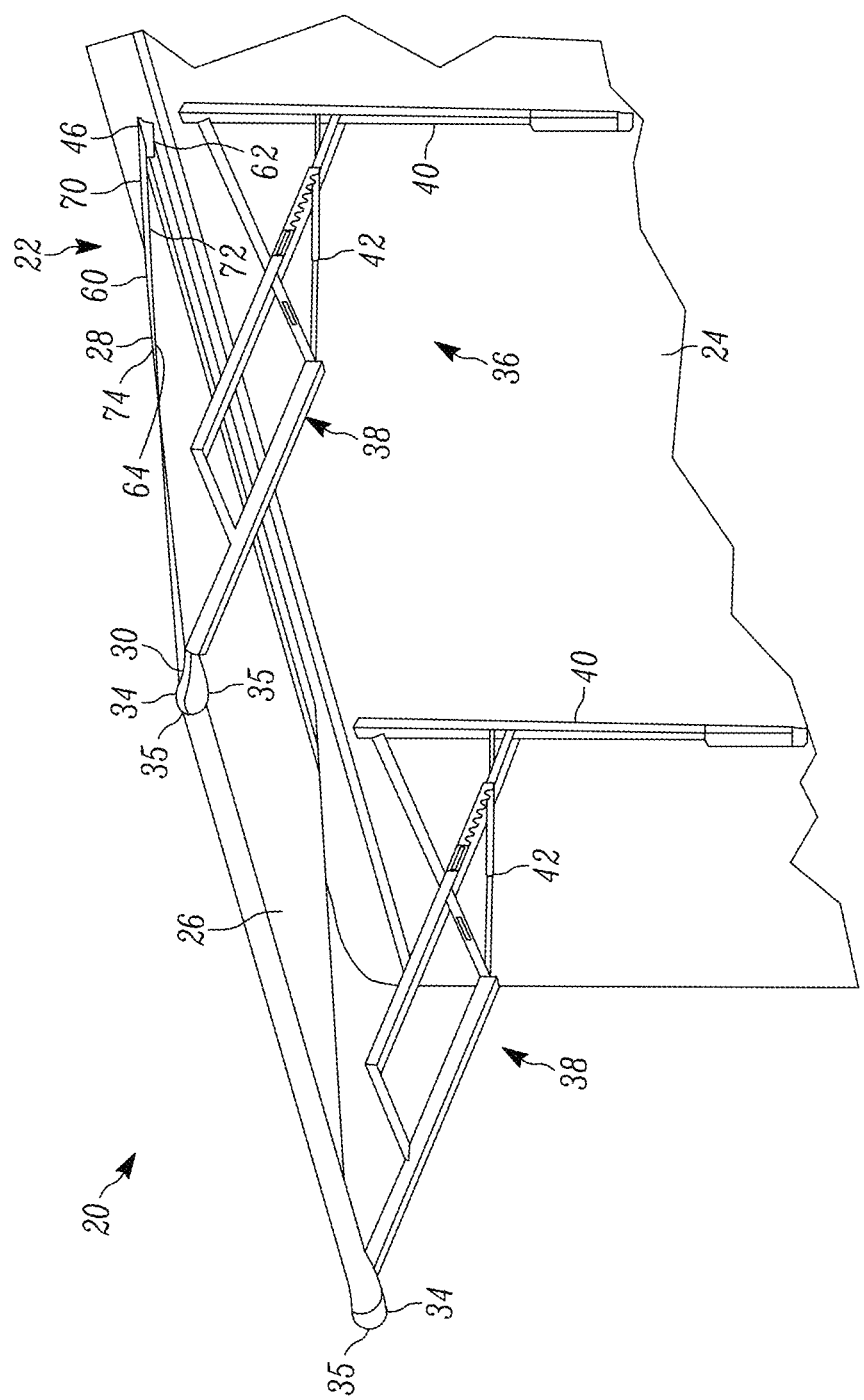
FIG. 3 is a perspective view of an awning assembly in a expanded or open position in accordance with one example embodiment of the present disclosure.

In the example embodiment of FIG. 1, the motors 34 are hidden or enclosed to be protected from the elements in respective housings or covers 35. In the illustrated example embodiment, the covers 35 are made from plastic or metal and may include a coated material 39 such as glossy paint or similar protective coatings as applied by a secondary manufacturing process.

The support system 36 disclosed is of the type shown in more detail in U.S. Pat. No. 6,971,433, which is of common ownership with the present application and the disclosure of which is hereby incorporated by reference. Suffice it to say the support system includes the scissors-type arms 38 mounted on a vertical track 40 on the support surface 24. The support system 36 is shown extended in FIG. 3 with the awning assembly 20 in the extended position and fully retracted in FIG. 1 wherein it will be appreciated the support system is vertically disposed and in close adjacent relationship with the support surface 24.

As will be appreciated, and as possibly best illustrated in FIG. 2, as the motors 34 are driven in one or the other direction (see arrows in FIG. 2), the awning canopy 26 is rolled onto or unrolled from the roll bar 32 causing the awning to retract or extend, respectively in cooperation with gas springs 42 associated with each support arm 38. Of course, when the roll bar 32 is rotated as shown in FIG. 2 in a first direction A to retract the awning 20 by wrapping the awning canopy 26 about the roll bar, the support arms 38 are forced to retract against the bias of the gas springs until in the fully retracted first position of FIG. 1.

To open the awning assembly 20, the roll bar 32 is rotated as shown in FIG. 2 in a second direction B to extend the awning by unwrapping the awning canopy 26 from the roll bar. The support arms 38 are assisted by the bias of the gas springs until fully extended to the second position of FIG. 3.

Figure 4:
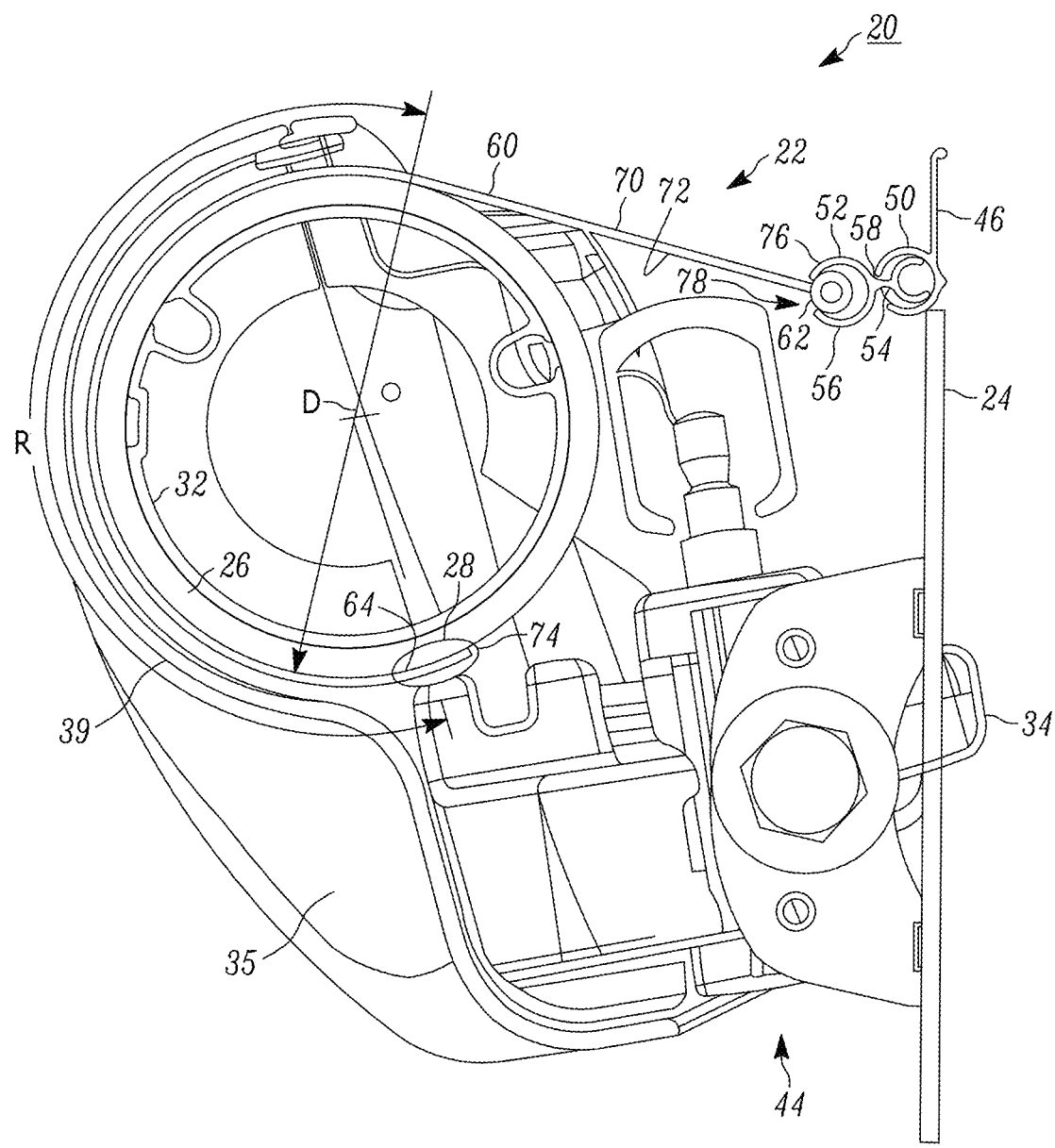
FIG. 4 is a cross-sectional view of an awning assembly having a connection system constructed in accordance with one example embodiment of the present disclosure.
Figure 5:
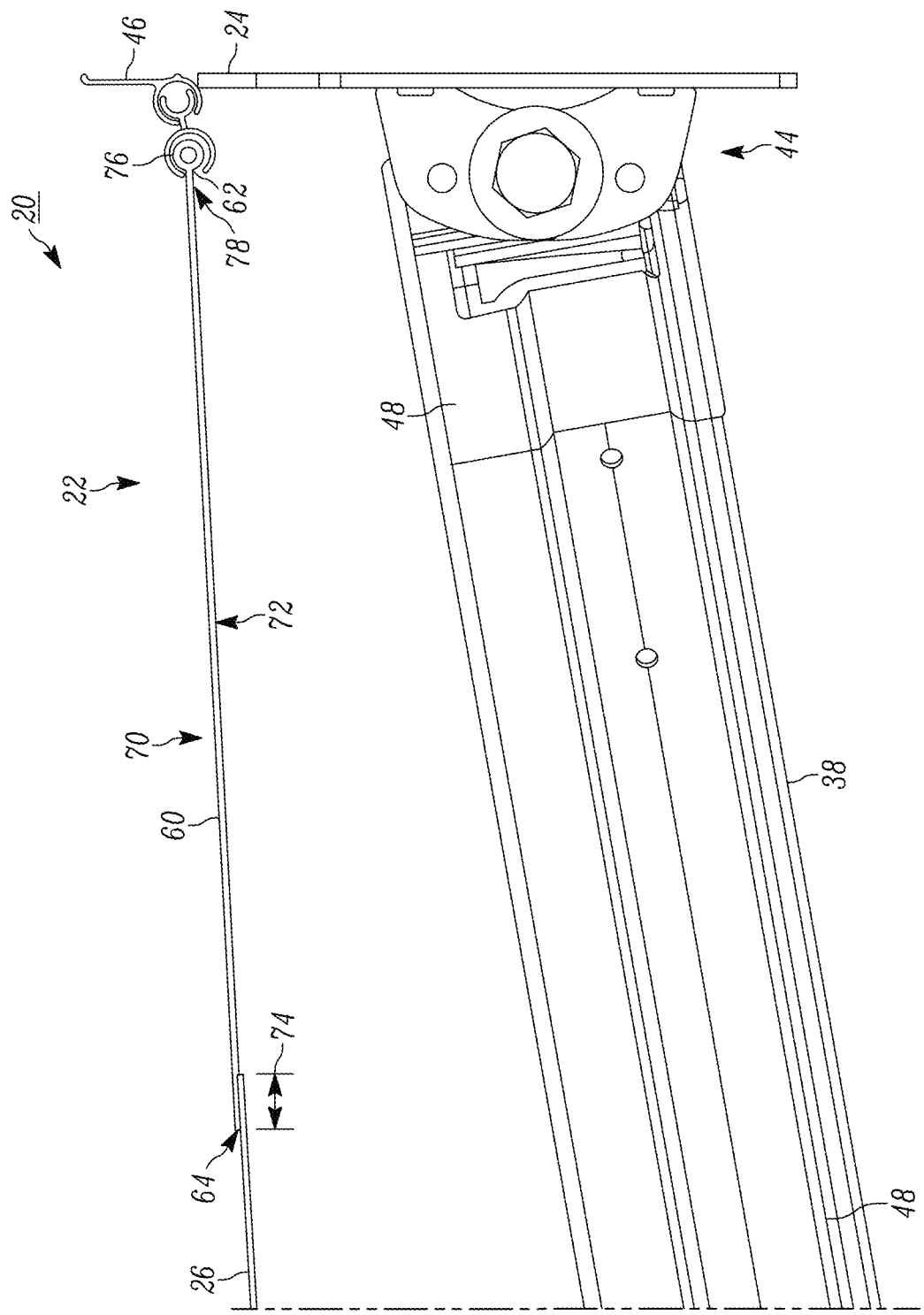
FIG. 5 is a partial expanded view of the awning assembly of FIG. 4 in accordance with one example embodiment of the present disclosure.
Figure 6:
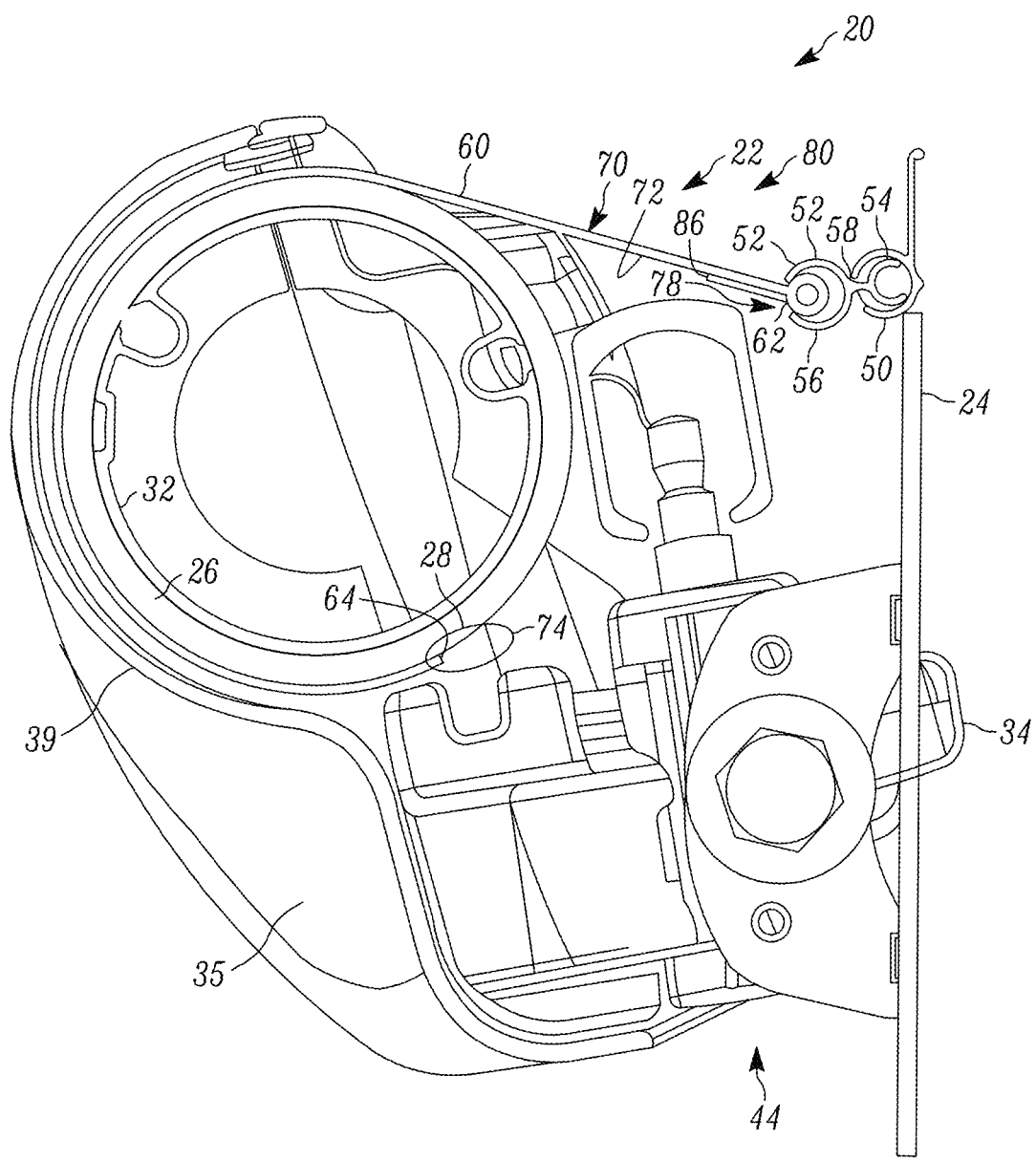
FIG. 6 is a cross-sectional view of an awning assembly having a connection system constructed in accordance with another example embodiment of the present position.
Figure 7:
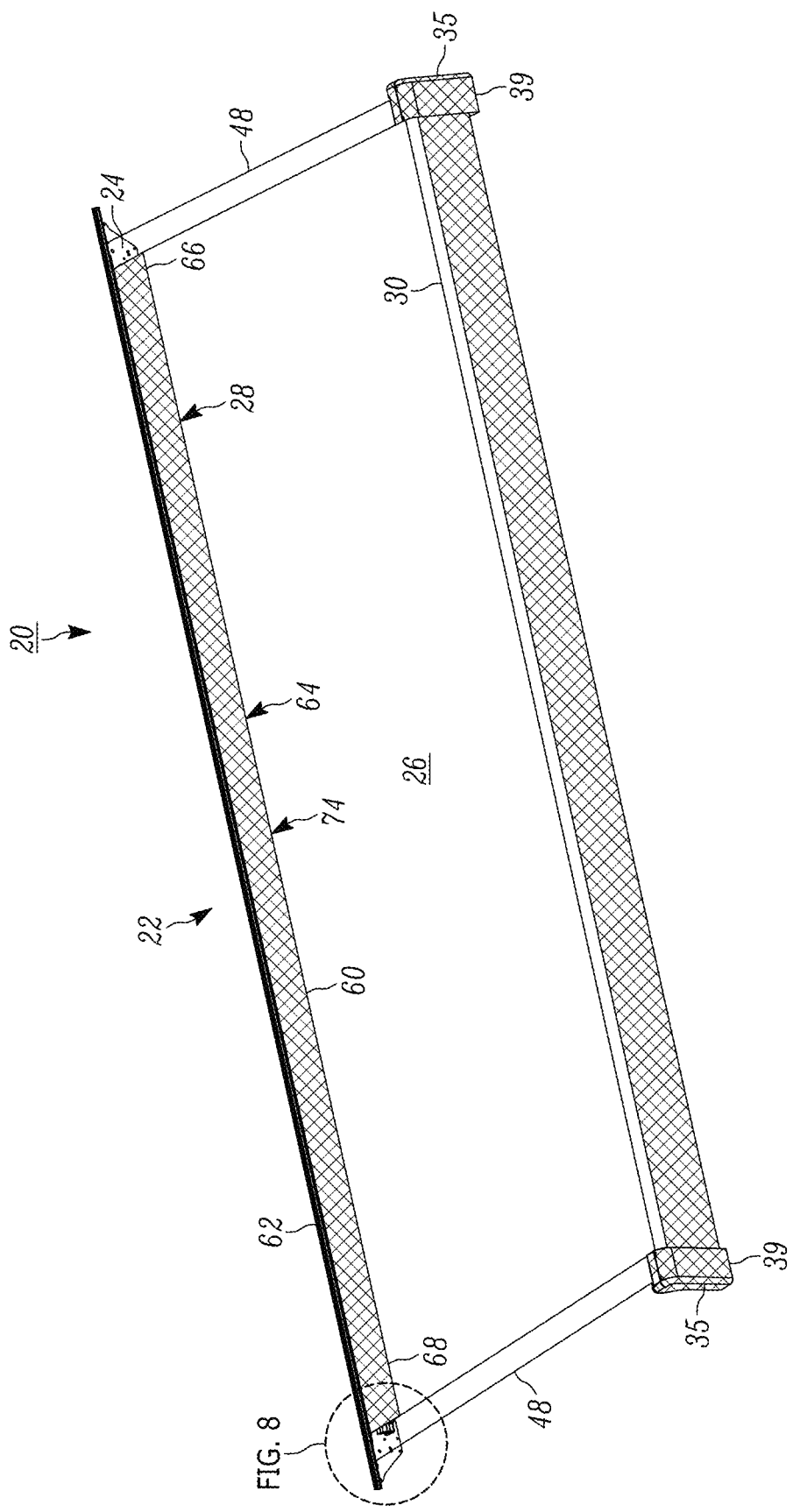
FIG. 7 is a perspective view of the awning assembly of FIG. 6 in an expanded position.
Figure 8:
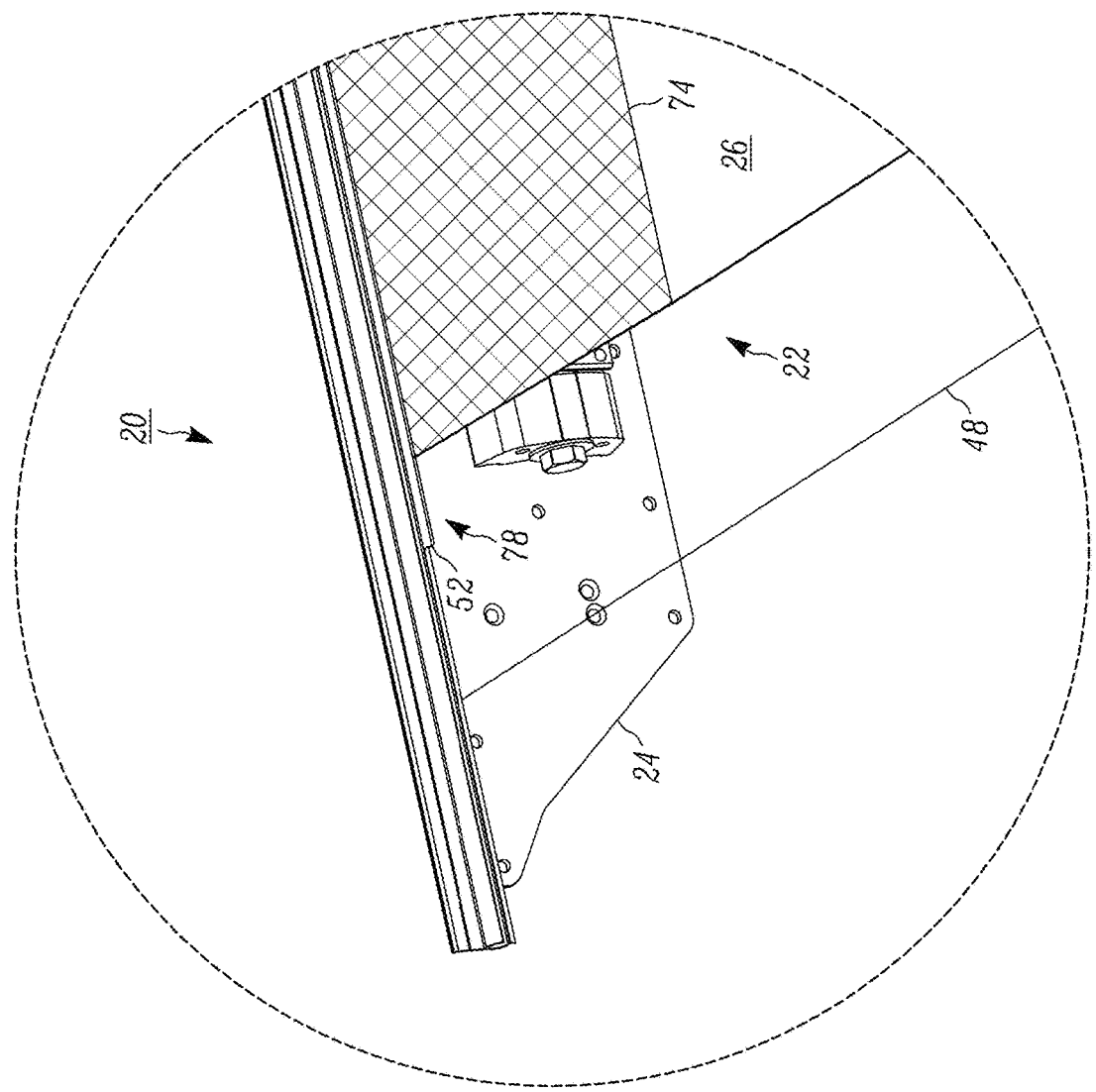
FIG. 8 is a magnified view of portion "8" of FIG. 7.
Figure 9:
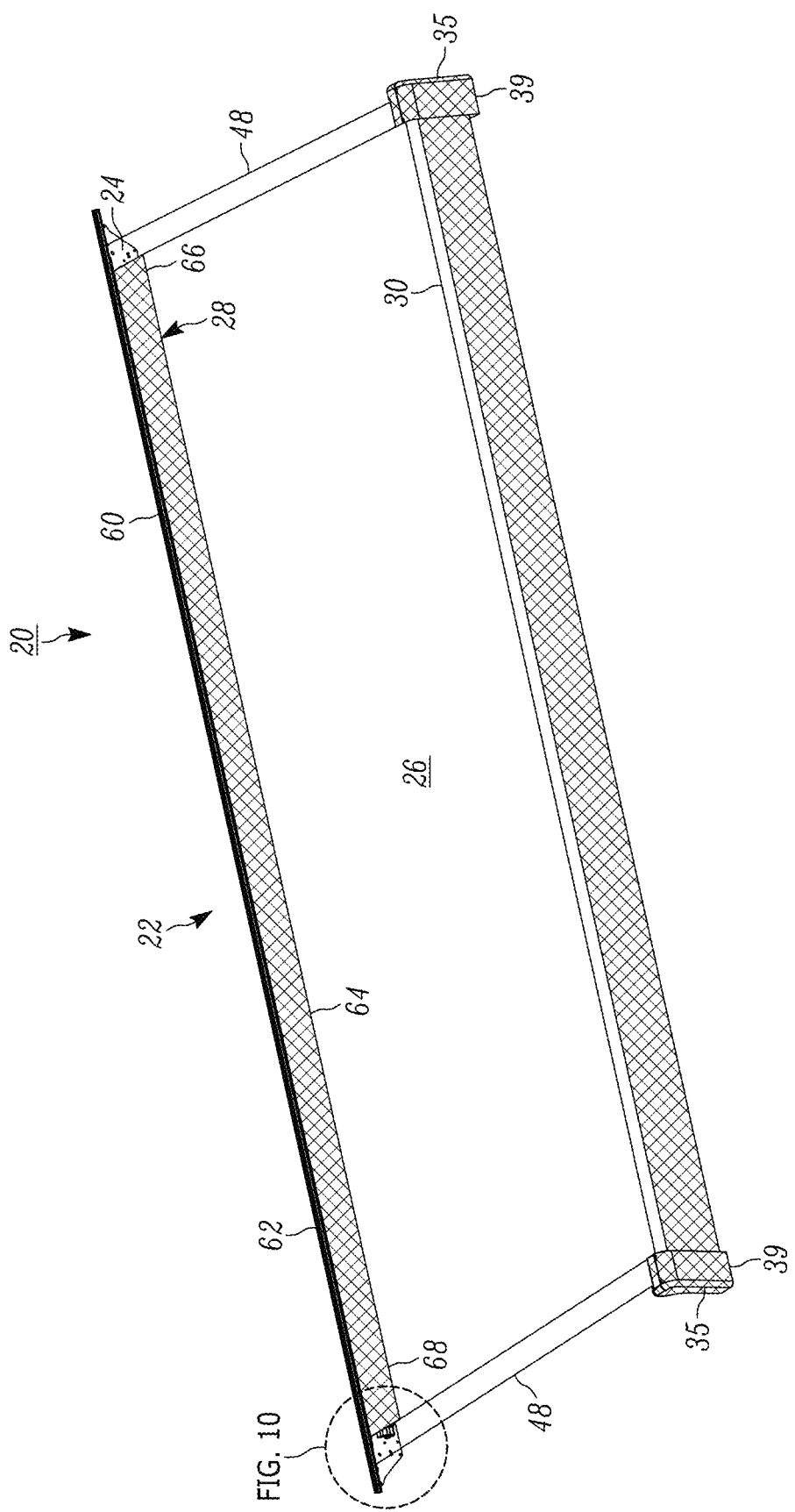
FIG. 9 is a perspective view of the awning assembly of FIGS. 4 and 5 in an expanded position.
Figure 10:
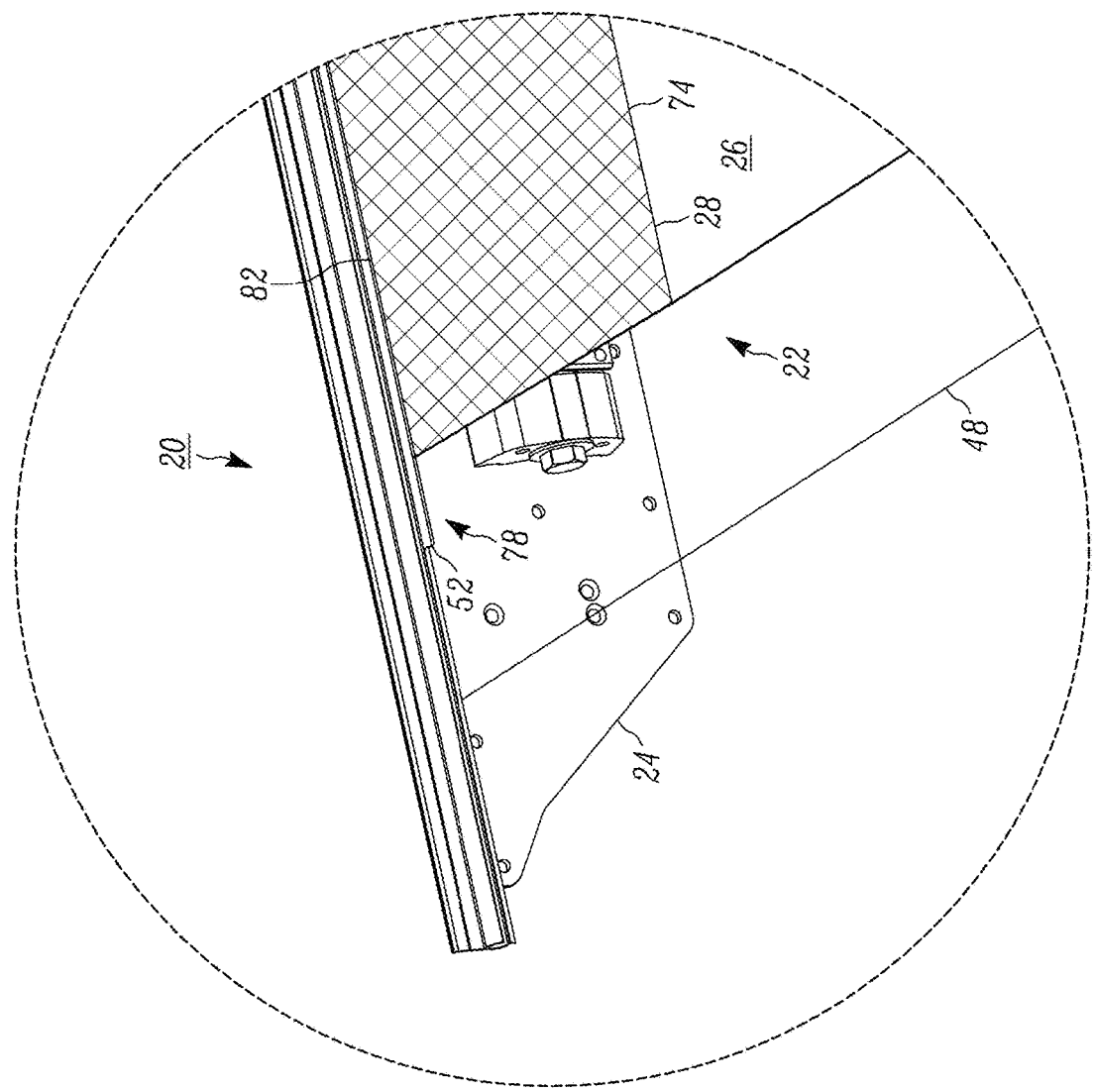
FIG. 10 is a magnified view of portion "10" in FIG. 9.

It should be appreciated by those of ordinary skill in the art that the awning assembly 20 in another example embodiment has support arms 38 that retract up and/or rotate inwards as indicated by arrows C in FIG. 1 by a fixture assembly 44 illustrated in FIGS. 4-6. The fixture assembly 44 is fixedly attached to the support surface 24. Moreover, the support arms 38 and fixture assembly 44 from which they are rotatably attached in the illustrated example embodiment of FIG. 5 are positioned closer to the awning assembly 20 support rail 46 relative to the locations shown in the illustrated example embodiment of FIGS. 1-3.

In the illustrated example embodiments of FIGS. 4-11, the support arms 38 comprise a plurality of rotatable tubes 48 as would be appreciated by those of ordinary skill in the art. The rotatable tubes 48 expand outward to support the outer edge 30 of the canopy 26, similar to the intent of the scissor arms illustrated in FIGS. 1-3.

The awning support rail 46 comprises a tubular support channel 50 for holding an intermediate member 52 having semi-annular tubular first and second members 54 and 56, respectively spaced by linear portion 58. First, semi-annular tubular member 54 includes a smaller outer diameter than the inner diameter of the tubular support channel 50, which includes a slot opening along the channel for receiving and retaining the first semi-annular member 54.

The connection system 22 comprises a flexible or pliable film segment 60 of unitary construction for connecting the canopy 26 to the vertical support surface 24 via the awning support rail 46 and intermediate member 52. Because of the film segment's construction, the segment 60 can advantageously match, mimic, or contrast the appearance of the hardware of the awning assembly 20 when the awning assembly is in a closed position acting as an aesthetic cover 63 while still protect the awning canopy 26 without the need and cost of a conventional hard-case housing. Stated another way, the upper surface 70 comprises a gloss level that closely resembles painted and plastic components on the awning assembly 20. In one example embodiment, the film segment 60 is rotated about a roll bar 32 multiple times without any reduction in an upper surface 70 gloss level maintaining a gloss unit of measure generally between 30 and 100%, and more specifically 90%+/−5% for black films 39B and 80%+/−5% for white and silver (metallic) films.

In one example embodiment, the film segment 60 is a flexible unitary member comprising a proximal end 62, a distal end 64 spaced opposite the proximal end, first and second sides, 66, 68, respectively, and an upper surface 70 opposite a lower surface 72. The film segment 60 is approximately twenty-five percent (10%) of the part of protective covering for providing shelter and shade as the screen of the awning while the awning canopy 26 makes up the remaining ninety percent (90%), as illustrated in FIGS. 3, 5, and 7-10. In one example embodiment, the flexible film segment 60 is substantially the same width as the awning canopy 26 and their collective lengths making up the awning screen (see FIG. 7) of the awning assembly 20.

It should be appreciated that alternative example embodiments the film segment 60 could be longer or shorter, making up more or less of the protective canopy. For example, awning assemblies 20 constructed for slideouts and small windows may have a film segment 60 that is between ten (10%) and thirty (30%) percent of the total awning length.

The unitary film segment 60 in one example embodiment is a homogeneous film, such as polyvinylchloride ("PVC"). While in another example embodiment, the unitary film segment 60 is a co-extruded film bonded together with a combination of PVC making the upper aesthetic portion 60a of the upper surface 70 and a scrim material 60B (see FIGS. 14-16) providing reinforcement or strength to the unitary film 60. The scrim material 60B is a reinforcement fiber that can be woven into for example a grid or diamond-shaped pattern. Various embodiments are shown in FIGS. 13-16 for manufacturing the unitary film 60.

Figure 14:
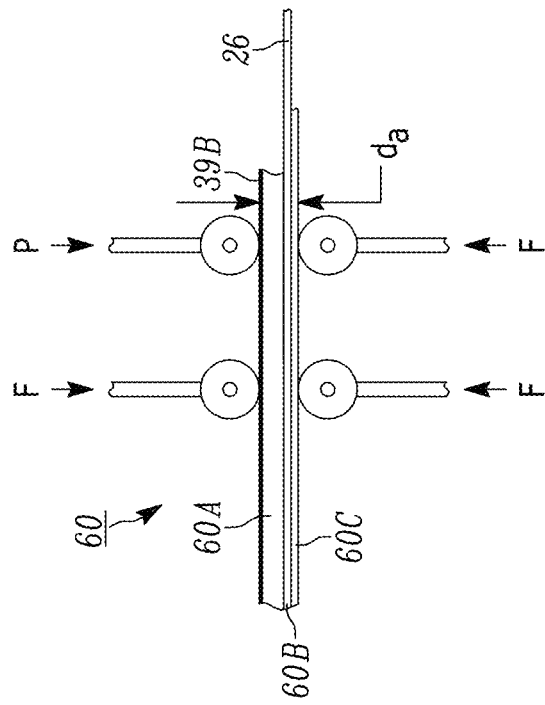
FIGS. 13-16 illustrate manufacturing processes for forming various unitary films in accordance with multiple example embodiments of the present disclosure.

In yet another example embodiment, the unitary film segment 60 is tri-extruded film bonded together with a combination of PVC making the upper aesthetic portion 60a of the upper surface 70, a scrim material 60B, providing reinforcement or strength to the unitary film 60, and PVC forming a lower portion 60c, as illustrated in FIG. 14. The lower portion 60c is the same PVC material as the upper portion 60a, except thinner in thickness. In one example embodiment the upper aesthetic portion 60a is thick enough to prevent the scrim from bleeding through the PVC. In another example embodiment, the thickness of upper PVC 60a is 0.030" of one inch and lower PVC 60c is 0.010" of one inch, providing a stackup of the unitary film 60 with scrim being approximately 0.035" to 0.050" of one inch, as illustrated by dimension $d_a$ in FIG. 14.

In the illustrated example embodiment, the film segment 60 is a unitary homogenous polymeric material, such as but not limited to, a thermoplastic material, such as polyvinyl chloride film, polyester, and polyethylene capable of receiving the coating material or film 39B. One suitable example of a polyester film is a product sold under the trademark Mylar® by the DuPont Corporation. The unitary film segment 60 in one example embodiment is extruded as a single uniform polymeric material, incapable of separation without destruction and includes a construction free of fibers, woven strands, or any combination thereof.

Illustrated in FIG. 12 is an alternative example embodiment wherein the unitary polymeric film segment 60 is laminated to a reinforcement substrate 61 to enhance the strength of the film segment forming a composite cover 63, while allowing it to maintain its upper surface 70 properties capable of retaining surface coatings 39B, as discussed below in more detail. In one example embodiment, the reinforcement substrate 61 is a woven or fabric material. In another example embodiment, the reinforcement substrate 61 can either be attached to the canopy 10 in a similar fashion as the film segment 60 (as further described below) or remain unattached to the canopy, while the film includes such attachment at its distal end 64.

The film segment 60 forms an attached region 74 substantially along its entire distal end 64 to the entire proximal edge 28 of the canopy 26 from the first side 66 to the second side 68. The attached region 74 in the illustrated example embodiment is formed by welding the entire attached region of the canopy 26 to the to the film segment 60. In alternative example embodiments, the attached region 74 secures the canopy 26 to the film segment 60 by co-extruding both the canopy with the film segment, hot melt forming, sewing, adhesive bonding (such as glue), or any combination thereof.

Under testing conditions, the welding of the film segment 60 when made from polyvinyl chloride film along the attached region 74 will hold will cause failure to the canopy material 26 before yielding occurs in the attached region. That is, the film segment 60 and the attached region 74, whether by welding, adhesive bond, sewing, or any combination thereof is stronger than the canopy material 26.

In one example embodiment, testing occurred and the film 60, and attached region withstood over forty (40) pounds per linear inch before failure occurred at the canopy 26, while no failure existed at the attached region 74 or in the film 60. Such testing occurred with a canopy 26 made from polyvinyl chloride fabric comprising woven threads. The relatively uniform construction of the film segment 60 over the woven polyvinyl canvas provides advantages strength adhering properties from the welded attached region 74.

In another example embodiment, the reinforcing substrate 61 causes the unitary film 60 to resist stretching and remain stable over the forces and ambient temperature range the film is subjected to during normal operating conditions. Thus, the unitary film 60 has even greater strength than the canvas material 26 described in the aforementioned example embodiments.

Referring to the example embodiment of FIGS. 4 and 5, the film segment 60 extends between its sides 66, 68 from the attached region 74 at the distal end 64 to the proximal end 62. The proximal end 62 is then is coupled to the vertical support surface 24 via awning support rail 46 and intermediate member 52. In particular, the film segment 60 includes an annular tubular boss 76 that when installed slides through linear opening 78 into the semi-annular second tubular member 56 of the intermediate member 52. The annular tubular boss 76 is then retained within the semi-annular second tubular member 56, because the outer diameter of the boss is greater than the distance in the linear opening 78.

Referring to the example embodiment of FIG. 6, the film segment 60 extends between its sides 66, 68 from the attached region 74 at the distal end 64 to the proximal end 62. The proximal end 62 is then is coupled to the vertical support surface 24 via awning support rail 46 and intermediate member 52. In particular, the film segment 60 includes a connection region 80 to a keder 82 having an annular tubular boss 84 that when installed, slides through linear opening 78 into the semi-annular second tubular member 56 of the intermediate member 52. The annular tubular boss 84 is then retained within the semi-annular second tubular member 56, because the outer diameter of the boss is greater than the distance in the linear opening 78. In an alternative example embodiment, the proximal end 62 is connected directly to the tubular support channel 50, avoiding the need of the intermediate member 52.

The connection region 80 is formed between the film segment 60 and a linear extension 86 of the keder 82 from substantially the first to second side 66, 68 of the film segment. In the illustrated example embodiment, the connection region 80 is formed by welding the extension 86 and proximal end 62 of the film segment 60 together from first and second sides 66, 68. In alternative example embodiments, the connection region 80 secures the film segment 60 to the linear extension 86 by co-extruding both the keder 82 with the film segment, hot melt forming, sewing, and the like.

In one example embodiment, the keder 82 is of a calendared construction polymer or polywrap flat roll stock. For example, one suitable keder 82 is a keder manufactured by American Keder under part number 11.0730.7.1. Other suitable examples of keder 82 materials include polyvinyl chloride and polyester.

As illustrated in FIGS. 1 and 11, when the awning assembly 20 is rolled-up or in the closed position, the only portion of the awning visible is the film segment 60 between the two housings 35. The unitary construction of the film segment 60 of the present disclosure provides a water tight cover over the canopy 26 portion of the awning when in the closed or retracted position (see FIG. 1), thus protecting it in a superior way over aluminum and woven fabrics of traditional awnings. This is further understood by the over 180 degrees of wrinkle-free coverage provided by the film segment 60 designated by reference dimension "R" illustrated in FIG. 4 about the center "O" of the roll bar 32. As well, the unitary construct of the film segment 60 provides a tight and compressed diameter "D" over conventional woven fabric wrap awning constructions.

In the illustrated example embodiment of FIG. 4, the diameter D using the unitary film segment 60 is capable of compressing the canopy 26 to a diameter D to ¾" to 1" inch less than a conventional aluminum or metal cover. Thus, greater protection is provided by the film segment 60 to the canopy 26. As well, the film segment 60 provides from side 66 to side 68 in the closed position a tight wrinkle free appearance not possible with conventional vinyl fabric covers or wraps.

While yet another advantage of the unitary construction of the film segment 60 is the film is capable of mimicking painted or coated hardware such as the housings 35, as illustrated in FIGS. 1 and 11. In the example embodiment, the film 60 provides a gloss appearance level of 30-100%, not possible with traditional vinyl or canvas awnings. Stated another way, conventional vinyl fabric wrap awnings fail to provide such finished coating options, because of cracking and other limitations found in such materials. While the aluminum covers in conventional awnings are manufactured at a significantly higher cost in both materials and labor, while remaining bulky and non-uniform in appearance. Moreover, the film segment 60 when acting as a cover in the closed position of FIGS. 1 and 11 can be extruded with a pigment of a desired color to create a finished coating 39B to match, contrast, or mimic the hardware such as the housings 35 with little additional cost. Alternatively, the film segment 60 because it is not woven or a fabric can include a finish coating 39B with variations of metal mimicking coatings, such as anodized finishes, metallic flaking, carbon fiber, or chrome plating, as desired and for example, to match, or complement in an aesthetically pleasing way, the awning assembly 20.

Figure 13:
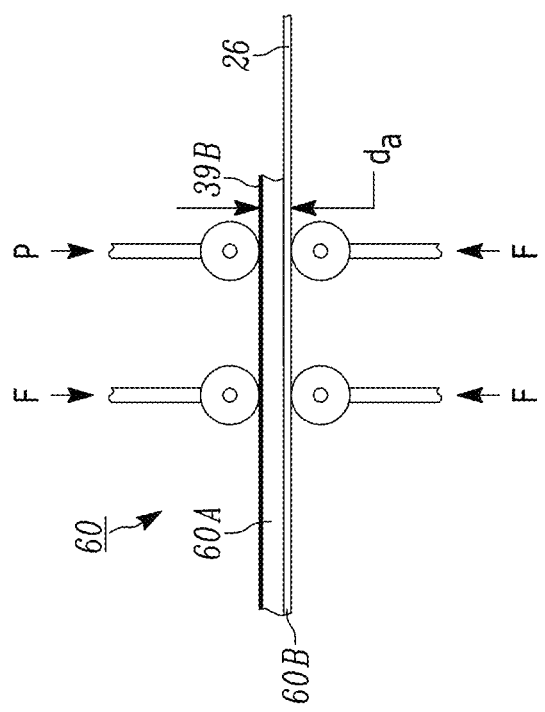

Illustrated in FIGS. 13-16 are manufacturing processes for forming various unitary films 60. The unitary films 60 illustrated in the manufacturing processes are bonded to the awning canopy by a heating or extruding operation. In particular, FIG. 13 illustrates a unitary film 60 being a homogenous material 60a that is co-extruded with the awning canopy 26 through a first pair of pinch rollers followed by a polishing roller ("P") that adds the gloss polish or coating 39B to the upper surface 70. The co-extruding process creates the unitary film 60 resulting in an integral connection inseparable without destruction. In one example embodiment, the unitary homogenous material 60a is PVC and the awning canopy 26 is vinyl or cloth. In another example embodiment, the polish provided by the polishing roller P provides a gloss level to the upper surface between 30 and 100%.

FIG. 14 illustrates a unitary film 60 comprising a first material 60a, a second or middle material 60b, and a third material 60c that is collectively tri-extruded through a first pair of pinch rollers followed by a polishing roller ("P") that adds the gloss polish or coating 39B to the upper surface 70 of the first material 60a. The tri-extruding process creates the unitary film 60, resulting in an integral connection inseparable between the materials without destruction. In one example embodiment, the first material 60a and third material 60c is PVC and the second or middle material 60b is a scrim fabric. The unitary film 60 is then further heat bonded or tri-extruded to connect with the awning canopy 26. In the illustrated example embodiment, the polish provided by the polishing roller P provides a gloss level to the upper surface between 30 and 100%. The third material 60c helps secure the scrim 60b to the first material 60a, the scrim 60b providing strength to the unitary film 60.

Figure 15:
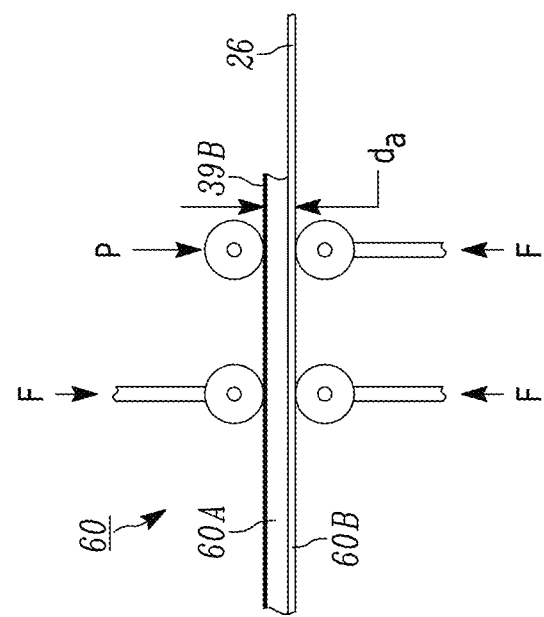

FIG. 15 illustrates a unitary film 60 comprising a first material 60a and a second material 60b that is collectively co-extruded through a first pair of pinch rollers followed by a polishing roller ("P") that adds the gloss polish or coating 39B to the upper surface 70 of the first material 60a. The co-extruding process creates the unitary film 60, resulting in an integral connection inseparable between the materials without destruction. In one example embodiment, the first material 60a is PVC and the second material 60b is a scrim fabric. The unitary film 60 is then further heat bonded or extruded to connect with the awning canopy 26. In the illustrated example embodiment, the polish provided by the polishing roller P provides a gloss level to the upper surface between 30 and 100%.

Figure 16:
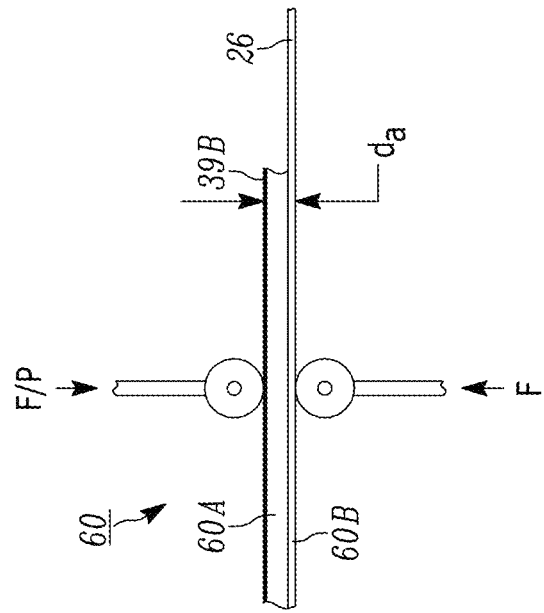

FIG. 16 illustrates a unitary film 60 comprising a first material 60a and a second material 60b that is collectively co-extruded through a pair of pinch rollers in which the upper pinch roller is a polishing roller ("P") that adds the gloss polish or coating 39B to the upper surface 70 of the first material 60a. The co-extruding process creates the unitary film 60, resulting in an integral connection inseparable between the materials without destruction. In one example embodiment, the first material 60a is PVC and the second material 60b is a scrim fabric. The unitary film 60 is then further heat bonded or extruded to connect with the awning canopy 26. In the illustrated example embodiment, the polish provided by the polishing roller P provides a gloss level to the upper surface between 30 and 100%.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

Figure 17A:
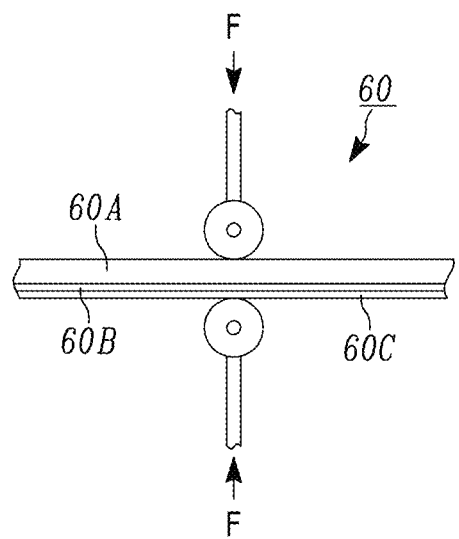
FIG. 17A illustrates a manufacturing process for forming a unitary file in accordance with another example embodiment of the present disclosure.

FIG. 17A similar to FIG. 14 illustrates a unitary film 60 comprising a first material 60a, a second or middle material 60b, and a third material 60c that is collectively tri-extruded through a pair of pinch rollers. The tri-extruding process creates the unitary film 60, resulting in an integral connection inseparable between the materials without destruction. In FIG. 17A, the first material 60a and third material 60c is PVC and the second or middle material 60b is a scrim fabric. The unitary film 60 is then further heat bonded or tri-extruded to connect with the awning canopy 26 at the attachment region 74. In the illustrated example embodiment the attachment region is approximately one-inch in length. The third material 60c helps secure the scrim 60b to the first material 60a, the scrim 60b providing strength to the unitary film 60.

Figure 17B:
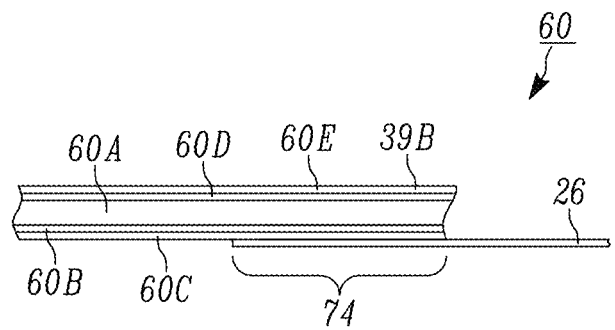
FIG. 17B illustrates a unitary film constructed in accordance with another example embodiment of the present disclosure.

Once the tri-extruded portion of the unitary film 60 is formed in FIG. 17A, it is then taken for completion of the remaining portion of the unitary film occurs by a laminating process illustrated in FIG. 17B in which a fourth material 60d of a thin layer (approximately 0.005") of polyethylene terephthalate (PET) a metal mimicking coating 39B, such as anodized finishes, metallic flaking, carbon fiber, or chrome plating to match, or complement in an aesthetically pleasing way, the awning assembly 20 is added along with a fifth layer of material 60e of clear or tinted PVC for scratch, weather, and UV protection that also allows welding to fabric or canopy 26.

Figure 17C:
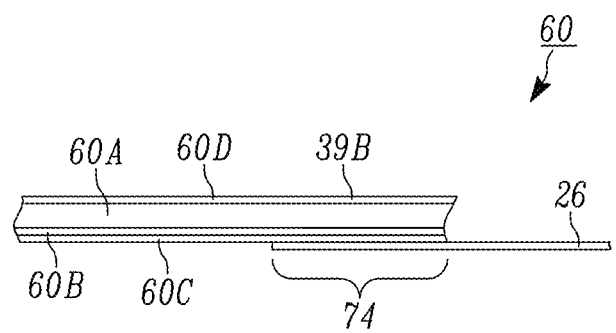
FIG. 17C illustrates a unitary film constructed in accordance with another example embodiment of the present disclosure.

In an alternative example embodiment, the unitary film 60 comprises four layers co-extruded as illustrated in FIG. 17C. In FIG. 17 C, the fourth layer 60d is a layer of PVC that is a metal mimicking coating 39B, such as anodized finishes, metallic flaking, carbon fiber, or chrome plating to match, or complement in an aesthetically pleasing way, the awning assembly 20. The fourth layer 60d of PVC in addition to providing the desired look also provides protection and adhesive capabilities for welding to the canopy material 26.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of constructing an awning assembly comprising an aesthetic awning cover that achieves a desired aesthetic appearance, the method comprising the steps of:
   providing a unitary film along a first portion of an awning screen, the unitary film being a set width substantially matching the width of said awning screen and a portion of the length of said awning screen, the unitary film being integrally formed from a first polished material and a second strengthening material;
   securing said unitary film to a single side of an awning canopy by a heating process along said set width to the awning canopy, the awning canopy having a substantially same width as said set width of said unitary film and said awning canopy having a length forming the remaining portion of said awning screen, the combination of said unitary film and said awning canopy forming said awning screen; and
   securing said awning screen to a roll bar of the awning assembly such that when said awning assembly is in a closed position, said unitary film provides an awning cover to said awning assembly.

2. The method of claim 1 wherein a step of integrally forming said first polished material with said second material further comprises the step of co-extruding said first material with said second material.

3. The method of claim 1 wherein a step of securing said unitary film by a heating process along said set width to an awning canopy further comprises the step of co-extruding said unitary film with said awning canopy.

4. The method of claim 1 further comprising a step of generating the first polished material by polishing a surface of said first material with a polishing wheel to have a gloss level of 30 to 100%.

5. The method of claim 1 further comprising a step of providing a coating to a surface of said first material such that said surface will obtain a gloss level of 30 to 100%.

6. The method of claim 1 wherein a step of forming said unitary film comprises forming the unitary film to comprise a homogenous uniform material.

7. The method of claim 1 wherein a step of forming said unitary film comprises forming the unitary film to comprise a homogenous uniform material that includes an upper surface that is exposed when the awning assembly is in the closed position and covers said awning canopy, the upper surface construction includes forming at least one of a finished coating and a polished coating on the upper surface.

8. The method of claim 1 wherein a step of forming said unitary film comprises forming the unitary film to comprise a homogenous uniform material that includes an upper surface that is exposed when the awning assembly is in the closed position and covers said awning canopy, and further selectively forming the unitary film with a pigment to provide a finished coating to said unitary film.

9. The method of claim 1 a step of forming said unitary film comprising forming a polyester film.

10. The method of claim 1 further comprising a step of providing a third material to the unitary film such that said second material is positioned between said first and third materials.

11. The method of claim 10 further comprising a step of providing said first and third materials in the form of polyvinylchloride and providing said second material in the form of a woven scrim fabric.

12. The method of claim 11 wherein a step of forming said unitary film comprises forming the unitary film to comprise a fourth material bonded to the first material on a side opposite the second material wherein said fourth material comprises a metal mimicking coating.

13. The method of claim 1 a step of forming said unitary film comprising forming a reinforcement substrate to form a composite cover.

14. The method of claim 13 comprising binding said reinforcement substrate to said canopy at an attached region.

15. The method of claim 13 comprising spacing said reinforcement substrate from said awning canopy during assembly.

16. A method of constructing an awning assembly comprising an aesthetic awning cover that achieves a desired aesthetic appearance, the method comprising the steps of:
providing a unitary film that is incapable of separation without destruction along a first portion of an awning screen, the unitary film being a set width substantially matching the width of said awning screen and a portion of the length of said awning screen, the unitary film being integrally formed from a first polished material and a second strengthening material;
securing said unitary film by co-extruding an awning canopy and the unitary film along said set width, the awning canopy having a substantially same width as said set width of said unitary film and said awning canopy having a length forming the remaining portion of said awning screen, the combination of said unitary film and said awning canopy forming said awning screen, the co-extruding comprising forming a top portion of the unitary film with the first polished material that is bonded to the second strengthening material, said polished material comprising a gloss level ranging between 30 and 100%, the unitary film coupled to the awning canopy along a first side opposite the top portion; and
securing said awning screen to a roll bar of the awning assembly such that when said awning assembly is in a closed position, said unitary film provides an awning cover to said awning assembly.

17. The awning assembly of claim 16 wherein said first polished material comprises a material suitable for painting or dying.

18. The awning assembly of claim 16 wherein said unitary film comprises polyvinylchloride as the first polished material and a woven scrim fabric as said second strengthening material.

19. The awning assembly of claim 18 comprising connecting a distal end of the unitary flexible film segment directly to said awning canopy via a single connection location between a single side of the awning canopy and a single side of the unitary flexible film segment.

20. A method of constructing an awning assembly comprising an aesthetic awning cover that achieves a desired aesthetic appearance, the method comprising the steps of:
providing a unitary flexible film segment that is incapable of separation without destruction along a first portion of an awning screen, the unitary film being a set width substantially matching the width of said awning screen and a portion of the length of said awning screen, the unitary film being integrally formed from a first polished material and a second strengthening material;
coupling an attached region of an awning canopy to a single side of said unitary flexible film segment to form the awning screen;
adding a color and contrast to the unitary flexible film segment that substantially matches end caps attached to a roll bar configured to support said awning screen;
providing a proximal end of the unitary flexible film segment for securing to a support structure; and
securing said awning screen to the roll bar of the awning assembly such that when said awning assembly is in a closed position, said unitary film provides an awning cover to said awning assembly.

* * * * *